US006218047B1

(12) United States Patent
Ovshinsky et al.

(10) Patent No.: US 6,218,047 B1
(45) Date of Patent: Apr. 17, 2001

(54) ACTIVE ELECTRODE COMPOSITIONS COMPRISING RANEY BASED CATALYSTS AND MATERIALS

(75) Inventors: Stanford R. Ovshinsky, Bloomfield Hills; Srinivasan Venkatesan, Southfield; Boyko Alajov, Rochester Hills; Thomas J. Hopper, Clarkston; Kevin Fok, Troy, all of MI (US)

(73) Assignee: Ovonic Battery Company, Inc., Troy, MI (US)

( * ) Notice: Subject to any disclaimer, the term of this patent is extended or adjusted under 35 U.S.C. 154(b) by 0 days.

(21) Appl. No.: 09/286,941

(22) Filed: Apr. 8, 1999

(51) Int. Cl.$^7$ ............................. H01M 4/32; H01M 4/36
(52) U.S. Cl. ...................... 429/223; 429/222; 429/218.1; 429/231.3
(58) Field of Search .................................. 429/223, 221, 429/220, 231.3, 222, 218.1

(56) References Cited

U.S. PATENT DOCUMENTS

| 3,637,437 | * | 1/1972 | Goldberger . |
|---|---|---|---|
| 3,981,749 | * | 9/1976 | Fukuda et al. . |
| 4,003,754 | * | 1/1977 | Winsel et al. . |
| 4,301,218 | * | 11/1981 | Benczur-urmossy . |
| 4,439,466 | * | 3/1984 | Chu . |
| 4,446,212 | * | 5/1984 | Kaun . |
| 4,551,400 | * | 11/1985 | Sapru et al. . |
| 5,096,667 | * | 3/1992 | Fetcenko . |
| 5,540,831 | * | 7/1996 | Klein . |

* cited by examiner

Primary Examiner—Patrick Ryan
Assistant Examiner—Jonathan Johnson
(74) Attorney, Agent, or Firm—Philip H. Schlazer; Marvin S. Siskind

(57) ABSTRACT

An active composition for the electrode of an alkaline electrochemical cell. The active composition comprises an active electrode material and an additive material selected from the group consisting of a Raney alloy, and a Raney catalyst. The active composition may be used to form metal hydride electrodes.

42 Claims, No Drawings

ACTIVE ELECTRODE COMPOSITIONS COMPRISING RANEY BASED CATALYSTS AND MATERIALS

FIELD OF THE INVENTION

The present invention relates to active compositions for electrodes of electrochemical cells. In particular, the present invention relates to active electrode compositions comprising Raney alloys and Raney catalysts.

BACKGROUND OF THE INVENTION

In rechargeable electrochemical cells, weight and portability are important considerations. It is also advantageous for rechargeable cells to have long operating lives without the necessity of periodic maintenance. Rechargeable electrochemical cells are used in numerous consumer devices such as calculators, portable radios, and cellular phones. They are often configured into a sealed power pack that is designed as an integral part of a specific device. Rechargeable electrochemical cells can also be configured as larger "cell packs" or "battery packs".

Rechargeable electrochemical cells may be classified as "nonaqueous" cells or "aqueous" cells. An example of a nonaqueous electrochemical cell is a lithium-ion cell which uses intercalation compounds for both anode and cathode, and a liquid organic or polymer electrolyte. Aqueous electrochemical cells may be classified as either "acidic" or "alkaline". An example of an acidic electrochemical cell is a lead-acid cell which uses lead dioxide as the active material of the positive electrode and metallic lead, in a high-surface area porous structure, as the negative active material. Examples of alkaline electrochemical cells are nickel cadmium cells (Ni-Cd) and nickel-metal hydride cells (Ni-MH). Ni-MH cells use negative electrodes having a hydrogen absorbing alloy as the active material. The hydrogen absorbing alloy is capable of the reversible electrochemical storage of hydrogen. Ni-MH cells typically use a positive electrode having nickel hydroxide as the active material. The negative and positive electrodes are spaced apart in an alkaline electrolyte such as potassium hydroxide.

Upon application of an electrical current across a Ni-MH cell, the hydrogen absorbing alloy active material of the negative electrode is charged by the electrochemical absorption of hydrogen and the electrochemical discharge of a hydroxyl ion, forming a metal hydride. This is shown in reaction equation (1):

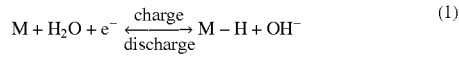
$$M + H_2O + e^- \underset{discharge}{\overset{charge}{\longleftrightarrow}} M-H + OH^- \qquad (1)$$

The negative electrode reactions are reversible. Upon discharge, the stored hydrogen is released from the metal hydride to form a water molecule and release an electron.

Hydrogen absorbing alloys called "Ovonic" alloys result from tailoring the local chemical order and local structural order by the incorporation of selected modifier elements into a host matrix.

Disordered hydrogen absorbing alloys have a substantially increased density of catalytically active sites and storage sites compared to single or multi-phase crystalline materials. These additional sites are responsible for improved efficiency of electrochemical charging/discharging and an increase in electrical energy storage capacity. The nature and number of storage sites can even be designed independently of the catalytically active sites. More specifically, these alloys are tailored to allow bulk storage of the dissociated hydrogen atoms at bonding strengths within the range of reversibility suitable for use in secondary battery applications.

Some extremely efficient electrochemical hydrogen storage alloys were formulated, based on the disordered materials described above. These are the Ti-V-Zr-Ni type active materials such as disclosed in U.S. Pat. No. 4,551,400 ("the '400 Patent") the disclosure of which is incorporated herein by reference. These materials reversibly form hydrides in order to store hydrogen. All the materials used in the '400 Patent utilize a generic Ti-V-Ni composition, where at least Ti, V, and Ni are present and may be modified with Cr, Zr, and Al. The materials of the '400 Patent are multiphase materials, which may contain, but are not limited to, one or more phases with $C_{14}$ and $C_{15}$ type crystal structures.

Other Ti-V-Zr-Ni alloys, also used for rechargeable hydrogen storage negative electrodes, are described in U.S. Pat. No. 4,728,586 ("the '586 Patent"), the contents of which is incorporated herein by reference. The '586 Patent describes a specific sub-class of Ti-V-Ni-Zr alloys comprising Ti, V, Zr, Ni, and a fifth component, Cr. The '586 Patent, mentions the possibility of additives and modifiers beyond the Ti, V, Zr, Ni, and Cr components of the alloys, and generally discusses specific additives and modifiers, the amounts and interactions of these modifiers, and the particular benefits that could be expected from them. Other hydrogen absorbing alloy materials are discussed in U.S. Pat. Nos. 5,096,667, 5,135,589, 5,277,999, 5,238,756, 5,407,761,and 5,536,591,the contents of which are incorporated herein by reference.

The reactions that take place at the nickel hydroxide positive electrode of a Ni-MH cell are shown in reaction equation (2):

$$Ni(OH)_2 + OH^- \underset{discharge}{\overset{charge}{\longleftrightarrow}} NiOOH + H_2O + e^- \qquad (2)$$

Examples of nickel hydroxide active materials are discussed in detail in U.S. Pat. Nos. 5,344,728, 5,348,822, 5,637,423, 5,523,182, 5,569,563, the contents of which are incorporated by reference.

At present, sintered or pasted nickel hydroxide positive electrodes are used in NiCd and Ni-MH cells. The process of making sintered electrodes is well known in the art. Sintered nickel electrodes consist of a porous nickel plaque of sintered high surface area nickel particles impregnated with nickel hydroxide active material either by chemical or electrochemical methods. To achieve higher discharge capacity and percent utilization, the trend has been away from sintered positive electrodes and toward foamed and pasted electrodes. Pasted nickel electrodes consist of nickel hydroxide particles in contact with a conductive network or substrate. Examples include plastic-bonded nickel electrodes using graphite as a microconductor, and foam-metal electrodes using high porosity nickel foam as a substrate loaded with nickel hydroxide particles. Pasted electrodes of the foam-metal type now dominate the consumer market due to their low cost, simple manufacturing, and higher energy density relative to sintered nickel electrodes.

The present invention discloses active compositions for the negative electrodes as well as for the positive electrodes of alkaline electrochemical cells. The active compositions provide for increased electrode capacity and utilization.

SUMMARY OF THE INVENTION

An objective of the present invention is to provide electrodes for alkaline electrochemical cell having increased capacity and utilization. Another objective of the present invention is to provide electrochemical cells having increased capacity and utilization.

These and other objectives are satisfied by an active composition for an electrode of an alkaline electrochemical cell, comprising: an active electrode material; and an additive selected from the group consisting of a Raney alloy, and a Raney catalyst.

These and other objective are also satisfied by an electrode for an alkaline electrochemical cell, comprising: a conductive substrate; and an active composition affixed to said substrate, said active composition comprising: an active electrode material, and an additive selected from the group consisting of a Raney alloy, and a Raney catalyst.

These and other objective are also satisfied by a electrode for an alkaline electrochemical cell, comprising: a conductive substrate; an active material affixed to said conductive substrate; and an additive material affixed to said active material, said additive material selected from the group consisting of a Raney alloy, and a Raney catalyst.

These and other objectives are also satisfied by an alkaline electrochemical cell, comprising: a least one negative electrode; a least one positive electrode; and an alkaline electrolyte, wherein said negative electrode comprises an active composition affixed to a conductive substrate, said active composition comprising: an active electrode material; and an additive material selected from the group consisting of a Raney alloy, and a Raney catalyst.

These and other objectives are also satisfied by an alkaline electrochemical cell, comprising: a least one negative electrode; a least one positive electrode; and an alkaline electrolyte, wherein said positive electrode comprises an active composition affixed to a conductive substrate, said active composition comprising: an active electrode material; and an additive material selected from the group consisting of a Raney alloy, and a Raney catalyst.

These and other objectives are also satisfied by an alkaline electrochemical cell, comprising: a least one negative electrode; a least one positive electrode; and an alkaline electrolyte, wherein said negative electrode comprises: a conductive substrate; an active electrode material affixed to said substrate; and an additive material affixed to said active electrode material, said additive material selected from the group consisting of a Raney alloy, and a Raney catalyst.

These and other objectives are also satisfied by an alkaline electrochemical cell, comprising: a least one negative electrode; a least one positive electrode; and an alkaline electrolyte, wherein said positive electrode comprises a conductive substrate; an active electrode material affixed to said substrate; and an additive material affixed to said active electrode material, said additive material selected from the group consisting of a Raney alloy, and a Raney catalyst.

DETAILED DESCRIPTION OF THE INVENTION

Disclosed herein is an active composition for an electrode of an alkaline electrochemical cell. The active composition comprises an active electrode material, and an additive selected from the group consisting of a Raney alloy, and a Raney catalyst. The active composition may be formed as a mixture of the active electrode material and the additive material. The mixture may be formed by physically mixing the active electrode material with the additive material. Preferably, the additive material is a Raney catalyst.

A "Raney process" refers to a process for making a porous, active metal catalyst by first forming at least a binary alloy of metals where at least one of the metals can be extracted, and then extracting that metal whereby a porous residue is obtained of the insoluble metal which has activity as a catalyst. See, for example, "Catalysts from Alloys—Nickel Catalysts" by M. Raney, Industrial and Engineering Chemistry, vol. 32,pg. 1199,September 1940, and U.S. Pat. Nos. 1,628,190; 1,915,473; 2,139,602; 2,461,396; and 2,977,327 to M. Raney. A "Raney process metal" refers to any of a certain group of the insoluble metals well known in the Raney process art which remain as the porous residue and which typically are nickel, cobalt, copper, and iron. Insoluble alloys of nickel, cobalt, copper and iron may also be used.

A "Raney alloy" comprises a insoluble Raney process metal or alloy, and a soluble metal or alloy such as aluminum, zinc, or manganese, etc. (Silicon may also be used as an extractable material). A specific example of a Raney alloy is a Raney nickel-aluminum alloy comprising nickel and aluminum. Preferably, the Raney nickel-aluminum alloy comprises from about 25 to about 60 weight percent nickel and the remainder being essentially aluminum. More preferably, the Raney nickel-aluminum alloy comprises about 50 weight percent nickel and about 50 weight percent aluminum.

A "Raney catalyst" is a catalyst made by a Raney process which includes the step of leaching out the soluble metal from the Raney alloy. The leaching step may be carried out by subjecting the Raney alloy to an aqueous solution of an alkali metal hydroxide such as sodium hydroxide, or potassium hydroxide. After the leaching step, the remaining insoluble component of the Raney alloy forms the Raney catalyst. An example of a Raney catalyst is Raney nickel. Raney nickel may be formed by subjecting the Raney nickel aluminum alloy discussed above to the Raney process whereby most of the soluble aluminum is leached out of the alloy. The remaining Raney nickel can be controlled may comprise over 95 weight percent of nickel. Other examples of Raney catalysts are Raney cobalt, Raney copper, and Raney iron.

The active composition may be a mixture of the active electrode material and the additive material so as to form an active material mixture. The mixture may be formed by physically mixing the active electrode material with the additive material so that the active composition is a physical mixture. Mixing may be accomplished by a ball mill (with or without the mixing balls), a blending mill, a sieve, or the like. When the additive used is a Raney alloy, the Raney alloy preferably comprises between about 5 weight percent to about 20 weight percent of the active composition. When the additive used is a Raney catalyst, the Raney catalyst preferably comprises between about 2 weight percent and 20 weight percent of the active composition. More preferably, the Raney catalyst comprises between about 2 weight percent and 15 weight percent of the active composition.

The active electrode materials may be active positive electrode materials or active negative electrode materials. Examples of positive electrode materials are powders of lead oxide, lithium cobalt dioxide, lithium nickel dioxide, lithium nickel dioxide, lithium manganese oxide compounds, lithium vanadium oxide compounds, lithium iron oxide, lithium compounds, i.e., complex oxides of these compounds and transition metal oxides, manganese dioxide, zinc oxide, nickel oxide, nickel hydroxide, manganese hydroxide, copper oxide, molybdenum oxide, carbon fluoride, etc. Preferably, the active positive electrode material is a nickel hydroxide material.

Examples of negative electrode materials include metallic lithium and like alkali metals, alloys thereof, alkali metal absorbing carbon materials, zinc, cadmium, hydrogen absorbing alloys, etc. Preferably, the active negative electrode material is a hydrogen absorbing alloy, or a cadmium active material. More preferably, the active negative electrode material is a hydrogen absorbing alloy.

In one embodiment of the active composition, the active electrode material is a hydrogen absorbing alloy. Examples of hydrogen absorbing alloys are provided above. It is within the spirit and intent of this invention that any hydrogen absorbing alloy can be used. The hydrogen absorbing alloy may be physically mixed with either a Raney alloy or a Raney catalyst to form the active composition. The Raney alloy preferably comprises nickel, and more preferably is a Raney nickel aluminum alloy. The Raney catalyst is preferably Raney nickel. However, other Raney catalysts (such as Raney cobalt, Raney copper, or Raney iron) may also be used.

In another embodiment of the active composition, the active electrode material is a nickel hydroxide active material. Examples of nickel hydroxide materials are provided above, and it is in the spirit and scope of the present invention that any nickel hydroxide material may be used. The active composition may be formed by physically mixing the nickel hydroxide material with a Raney alloy or a Raney catalyst. Preferably, the Raney alloy comprises cobalt, and more preferably, is a Raney cobalt aluminum alloy. Preferably, the Raney catalyst is Raney cobalt.

In yet another embodiment of the active composition, the active electrode material is a cadmium based active material. The active composition may be formed by physically mixing the cadmium active material with a Raney alloy or a Raney catalyst. Preferably, the Raney alloy comprises copper, and more preferably the Raney alloy is a Raney copper aluminum alloy. Preferably, the Raney catalyst is Raney copper.

Also disclosed herein is an electrode for an alkaline electrochemical cell. The electrode comprises a conductive substrate, and an active composition affixed to the conductive substrate. The active composition is the active composition described above and comprises an active electrode material, and an additive selected from the group consisting of a Raney alloy, and a Raney catalyst.

The conductive substrate may be any electrically conductive support structure that can be used to hold the active composition. Examples of substrates include foam, grid, plate, foil, expanded metal or any other type of support structure. The actual form of the substrate used may depend on whether the substrate is used for the positive or the negative electrode, the type of active material used, whether it is paste type or non-paste type, etc. Examples of materials that may be used for the electrically conductive support include nickel, nickel alloy, copper, copper alloy, nickel-plated metals such as nickel-plated copper and copper-plated nickel, etc. The actual material used for the substrate depends upon many factors including whether the substrate is being used as the positive or negative electrode, the potential of the electrode, and the pH of the electrolyte. Commonly assigned U.S. Pat. Nos. 5,851,698, 5,856,047, the contents of which are incorporated by reference herein, disclose negative metal hydride electrodes comprising a substrate made from substantially pure copper.

An example of an electrode of the present invention is a metal hydride electrode comprising a conductive substrate and an active composition affixed to the substrate. The active electrode material used to form the active composition is a hydrogen absorbing alloy. Preferably, the active electrode material is physically mixed with either a Raney alloy or a Raney catalyst to form the active composition. The Raney alloy is preferably a Raney nickel aluminum alloy, and the Raney catalyst is preferably Raney nickel. The electrode may be made by compacting the active composition onto the conductive substrate where compaction may be accomplished by one or more rolling mills. Alternately, the active material composition may be pasted onto the conductive substrate. A paste may be formed by adding water and a "thickener" such as carboxymethyl cellulose (CMC) or hydroxypropylmethyl cellulose (HPMC) or the like to the active composition. The paste is then applied to the substrate. Preferably, the substrate used for the negative electrode is an expanded metal. The electrode is preferably used as a negative electrode of an alkaline electrochemical cell (i.e., a nickel-metal hydride electrochemical cell).

Another example of an electrode of the present invention is a cadmium electrode wherein the active electrode material used in the active composition is a cadmium active electrode material. Preferably, the cadmium active material is physically mixed with a Raney copper aluminum alloy, or with Raney copper. However, other Raney alloys or Raney catalysts may be used. In this example, the electrode is preferably used as a negative electrode in an alkaline electrochemical cell and more preferably used as the negative electrode of a nickel-cadmium alkaline electrochemical cell.

In yet another example of an electrode of the present invention is a nickel hydroxide electrode. In this instance, the active composition may be formed by physically mixing a nickel hydroxide active material with either a Raney alloy or a Raney catalyst. Preferably, the Raney alloy comprises cobalt (such as a Raney cobalt aluminum alloy), and preferably the Raney catalyst is Raney cobalt. The positive electrode may be formed by making the active composition into a paste (with the addition of water and thickener) and applying the paste onto the substrate. The substrate is preferably a nickel foam. The nickel hydroxide electrode may be used as a positive electrode for a nickel-based alkaline electrochemical cell such as a nickel-metal hydride cell.

In an alternate embodiment of the electrode of the present invention, the electrode may be formed by affixing the active electrode material to the conductive substrate, and affixing the additive material onto the surface of active electrode material. In this manner, the additive material may be incorporated as a surface layer of the electrode. (The additive material is the same as that described above and is selected from the group consisting of a Raney alloy, and a Raney catalyst). The electrode may be formed by first compacting or pasting the active electrode material onto the conductive substrate, and then affixing the additive material onto the surface of the active electrode material. The additive material may be made into a paste (i.e., with the addition of water and binder) and applied to the surface of the active electrode material. As an example, a metal hydride electrode of the present invention may be formed by first compacting or pasting a hydrogen absorbing alloy onto an expanded metal substrate. A Raney alloy or a Raney catalyst (preferably, a Raney nickel catalyst) may then be made into a separate paste and applied to the surface of the hydrogen absorbing alloy. The additive material forms an outer layer over the hydrogen absorbing alloy. Alternately, the additive material may be compacted onto the surface of the active electrode material, and the additive material may then be compacted onto the surface of the active material. Alternately, the active electrode material may be delivered to the surface of the substrate (for example, by a vibratory feeder), and the additive material may be delivered onto the top of the active electrode material (for example, also by a vibratory feeder). Both the active electrode material as well as the additive material may then be compacted simultaneously. Compaction may be accomplished by a rolling mill.

The electrodes of the present invention may be incorporated into alkaline electrochemical cells. Generally, disclosed herein is an alkaline electrochemical cell comprising one or more negative electrodes, one or more positive electrodes, and an alkaline electrolyte. At least one of the negative electrodes and/or one of the positive electrodes is an electrode of the type described herein.

In one embodiment of the electrochemical cell of the present invention the negative electrodes comprise a hydrogen absorbing alloy active electrode material. An additive material in the form of either a Raney alloy or a Raney catalyst (and preferably a Raney nickel catalyst) may either be mixed with the hydrogen absorbing alloy to form an active composition or may be applied to the electrode as a separate outer layer. (Both electrode embodiments have been described above). The positive electrodes may comprise a nickel hydroxide active material so that the electrochemical cell is a nickel-metal hydride electrochemical cell. The positive electrodes may further comprise additive material in the form of either a Raney alloy or a Raney catalyst (and preferably a Raney cobalt catalyst).

In another embodiment of the electrochemical cell of the present invention, the positive electrodes comprise a nickel hydroxide active material. An additive material in the form of either a Raney alloy or Raney catalyst (and preferably a Raney cobalt catalyst) may either be mixed with the hydrogen absorbing alloy to form an active composition or may be applied to the electrode as a separate outer layer.

EXAMPLE 1

An active composition is formed by physically mixing a hydrogen absorbing alloy with a Raney nickel catalyst. The active composition comprises about 8 weight percent of the Raney nickel catalyst. The active composition is made into a paste and affixed to a conductive substrate to form a negative electrode. The Raney nickel catalyst The "Raney modified" negative electrode is tested using a negative limited tri-electrode cell using a nickel hydroxide positive electrode. The discharge capacity of the Raney modified electrode is compared to the discharge capacity of a "standard" metal hydride electrode made with the same hydrogen absorbing alloy but without the Raney nickel catalyst. At a discharge rate of C/10, the Raney modified electrode has a discharge capacity which is about 27% greater than the discharge capacity of the electrode without the Raney catalyst. Although not wishing to be bound by theory, it is believed that the Raney nickel catalyst enhances the charge/discharge reaction equation (1) for a hydrogen absorbing alloy.

EXAMPLE 2

Raney nickel catalyst is made into a paste and applied to the surface of a metal hydride negative electrode. The Raney modified electrode is tested using a negative limited tri-electrode electrochemical cell using nickel hydroxide positive electrodes. At a discharge rate of C/10, the Raney modified electrode has a discharge capacity which is about 30% greater than the discharge capacity of the electrode without the Raney catalyst.

EXAMPLE 3

An active composition for the positive electrode is formed by mixing a nickel hydroxide material with Raney cobalt. The active composition comprises about 3 weight percent of Raney cobalt. The mixture is made into a paste and affixed to a conductive substrate to form a positive electrode. The "Raney modified" positive electrode is tested using a positive limited tri-electrode cell with metal hydride negative electrodes. The utilization of the Raney modified electrode is compared to a "standard" nickel hydroxide electrode made with the same nickel hydroxide material but without the Raney cobalt. At a discharge rate of C/10 the Raney modified electrode has a utilization which is about 7% greater than the utilization of the standard electrode.

It is noted that when an alkaline electrochemical cell of the present invention is made where the additive is a Raney alloy, the alloy will be converted to a Raney catalyst within the cell by the alkaline electrolyte.

While the invention has been described in connection with preferred embodiments and procedures, it is to be understood that it is not intended to limit the invention to the preferred embodiments and procedures. On the contrary, it is intended to cover all alternatives, modifications and equivalence which may be included within the spirit and scope of the invention as defined by the claims appended hereinafter.

We claim:

1. An active electrode composition comprising: a hydrogen absorbing alloy; and
   an additive selected from the group consisting of Raney alloy and Raney catalyst.

2. The active composition of claim 1, wherein said composition is a mixture.

3. The active composition of claim 1, wherein said Raney alloy comprises a first element selected from the group consisting of nickel, iron, copper, and cobalt.

4. The active composition of claim 3, wherein said Raney alloy comprises a first element selected from the group consisting of nickel, iron, copper, and cobalt.

5. The active composition of claim 3, wherein said Raney alloy comprises between about 25 weight percent and 60 weight percent of said first element.

6. The active composition of claim 4, wherein said Raney alloy comprises about 50 weight percent of said first element and about 50 weight percent of said second element.

7. The active composition of claim 1, wherein said Raney catalyst comprises at least one element selected from the group consisting of nickel, iron, copper, and cobalt.

8. The active composition of claim 1, wherein said Raney catalyst is selected from the group consisting of Raney nickel, Raney iron, Raney copper, and Raney cobalt.

9. A metal hydride electrode comprising:
   a hydrogen absorbing alloy; and
   an additive selected from the group consisting of Raney alloy and Raney catalyst.

10. The electrode of claim 9, wherein said hydrogen absorbing alloy is intermixed with said additive.

11. The electrode of claim 9, wherein said Raney alloy comprises a first element selected from the group consisting of nickel, iron, copper, and cobalt.

12. The electrode of claim 11, wherein said Raney alloy further comprises at second element selected from the group consisting of aluminum, zinc, manganese, and silicon.

13. The electrode of claim 11, wherein said Raney alloy comprises between about 25 weight percent and 60 weight percent of said first element.

14. The electrode of claim 12, wherein said Raney alloy comprises about 50 weight percent of said first element and about 50 weight percent of said second element.

15. The electrode of claim 9, wherein said Raney catalyst comprises at least one element selected from the group consisting of nickel, iron, copper, and cobalt.

16. The electrode of claim 9, wherein said Raney catalyst is selected from the group consisting of Raney nickel, Raney iron, Raney copper, and Raney cobalt.

17. An alkaline electrochemical cell, comprising:
   at least one negative electrode comprising a hydrogen absorbing alloy, and an additive selected from the group consisting of Raney alloy and Raney catalyst;
   at least one positive electrode; and
   an alkaline electrolyte.

18. The electrochemical cell of claim 17, wherein said Raney alloy comprises a first element selected from the group consisting of nickel, iron, copper, and cobalt.

19. The electrochemical cell of claim 18, wherein said Raney alloy further comprises a second element a second element selected from the group consisting of aluminum, zinc, manganese, and silicon.

20. The electrochemical cell of claim 17, wherein said positive electrode comprises nickel hydroxide.

21. The electrochemical cell of claim 17, wherein said Raney catalyst comprises at least one element selected from the group consisting of nickel, iron, copper, and cobalt.

22. The electrochemical cell of claim 17, wherein said Raney catalyst is selected from the group consisting of Raney nickel, Raney iron, Raney copper, and Raney cobalt.

23. The electrochemical cell of claim 17, wherein said hydrogen storage alloy is intermixed with said additive.

24. An active electrode composition, comprising:
   a nickel hydroxide material; and
   an additive selected from the group consisting of Raney alloy and Raney catalyst.

25. The active composition of claim 24, wherein said Raney alloy comprises a first element selected from the group consisting of nickel, iron, copper, and cobalt.

26. The active composition of claim 25, wherein said Raney alloy further comprises a second element selected from the group consisting of aluminum, zinc, manganese and silicon.

27. The active composition of claim 24, wherein said Raney catalyst comprises at least one element selected from the group consisting of nickel, iron, copper, and cobalt.

28. The active composition of claim 24, wherein said Raney catalyst is selected from the group consisting of Raney nickel, Raney iron, Raney copper, and Raney cobalt.

29. The active composition of claim 24, wherein said nickel hydroxide material is intermixed with said additive.

30. A nickel electrode, comprising:
   a nickel hydroxide material; and
   an additive selected from the group consisting of Raney alloy and Raney catalyst.

31. The electrode of claim 30, wherein said Raney alloy comprises a first element selected from the group consisting of nickel, iron, copper, and cobalt.

32. The electrode of claim 31, wherein said Raney alloy further comprises a second element selected from the group consisting of aluminum, zinc, manganese, and silicon.

33. The electrode of claim 30, wherein said Raney catalyst comprises at least one element selected from the group consisting of nickel, iron, copper, and cobalt.

34. The electrode of claim 30, wherein said Raney catalyst is selected from the group consisting of Raney nickel, Raney iron, Raney copper, and Raney cobalt.

35. The electrode of claim 30, wherein said nickel hydroxide material is intermixed with said additive.

36. An alkaline electrochemical cell, comprising:
   at least one negative electrode;
   at least one positive electrode comprising a nickel hydroxide material, and an additive selected from the group consisting of Raney alloy and Raney catalyst; and
   an alkaline electrolyte.

37. The electrochemical cell of claim 36, wherein said Raney alloy comprises a first element selected from the group consisting of nickel, iron, copper, and cobalt.

38. The electrochemical of claim 37, wherein said Raney alloy further comprises a second element selected from the group consisting of aluminum, zinc, manganese, and silicon.

39. The electrochemical cell of claim 36, wherein said Raney catalyst comprises at least one element selected from the group consisting of nickel, iron, copper, and cobalt.

40. The electrochemical cell of claim 36, wherein said Raney catalyst is selected from the group consisting of Raney nickel, Raney iron, Raney copper, and Raney cobalt.

41. The electrochemical cell of claim 36, wherein said negative electrode material comprises a hydrogen storage alloy.

42. The electrochemical cell of claim 36, wherein said nickel hydroxide material is intermixed with said additive.

* * * * *

UNITED STATES PATENT AND TRADEMARK OFFICE
CERTIFICATE OF CORRECTION

PATENT NO. : 6,218,047 B1
APPLICATION NO. : 09/286941
DATED : April 17, 2001
INVENTOR(S) : Stanford R. Ovshinsky et al.

It is certified that error appears in the above-identified patent and that said Letters Patent is hereby corrected as shown below:

In Item (75), Inventors, line 3:
 "Boyko Alajov" should read -- Boyko Aladjov --

Signed and Sealed this

Seventeenth Day of July, 2007

JON W. DUDAS
*Director of the United States Patent and Trademark Office*